(12) United States Patent
Xue et al.

(10) Patent No.: US 9,818,204 B2
(45) Date of Patent: Nov. 14, 2017

(54) METHOD FOR MONITORING, IDENTIFICATION, AND/OR DETECTION USING A CAMERA BASED ON A COLOR FEATURE

(71) Applicant: CapitalBio Corporation, Beijing (CN)

(72) Inventors: Yuan Xue, Beijing (CN); Guanbin Zhang, Beijing (CN); Cheng Chen, Beijing (CN)

(73) Assignee: CAPITALBIO CORPORATION, Beijing (CN)

( * ) Notice: Subject to any disclaimer, the term of this patent is extended or adjusted under 35 U.S.C. 154(b) by 35 days.

(21) Appl. No.: 14/866,552

(22) Filed: Sep. 25, 2015

(65) Prior Publication Data

US 2016/0092719 A1   Mar. 31, 2016

(30) Foreign Application Priority Data

Sep. 26, 2014   (CN) .......................... 2014 1 0502643

(51) Int. Cl.
  *G06K 9/00*   (2006.01)
  *G06T 7/246*   (2017.01)
  (Continued)

(52) U.S. Cl.
  CPC ............ *G06T 7/246* (2017.01); *G06K 9/4652* (2013.01); *G06T 7/90* (2017.01); *G06T 2207/10024* (2013.01)

(58) Field of Classification Search
  CPC ........ G06K 9/4652; G06T 2207/10024; G06T 7/0042; G06T 7/2033; G06T 7/246;
  (Continued)

(56) References Cited

U.S. PATENT DOCUMENTS 5,828,779 A * 10/1998 Maggioni ................. G06T 7/90
                                                                382/164
6,249,601 B1 * 6/2001 Kim .......................... G01J 3/46
                                                                348/E9.052
(Continued)

FOREIGN PATENT DOCUMENTS

| CN | 101141633 | 3/2008 |
| CN | 101599122 | 12/2009 |

(Continued)

OTHER PUBLICATIONS

First Examination Report for CN 201410502643.6, dated Feb. 3, 2017, 9 pages (Including English Translation).

(Continued)

*Primary Examiner* — Tom Y Lu
(74) *Attorney, Agent, or Firm* — Morrison & Foerster LLP

(57) ABSTRACT

The present disclosure relates to a method for camera identification and detection on color features. In some aspects, the method comprises: 1) starting the camera, the image processing unit and the display unit at the beginning of testing; 2) using the camera to capture the color characteristic value; and 3) moving the untested object to the detection area of the camera for it to be detected, wherein the image processing unit extracts the mean color characteristic value from the color pixels of the detection area.

35 Claims, 3 Drawing Sheets

(51) Int. Cl.
*G06K 9/46* (2006.01)
*G06T 7/90* (2017.01)

(58) Field of Classification Search
CPC .......... G06T 7/408; G06T 7/90; G01R 31/28; G01R 31/36
See application file for complete search history.

(56) References Cited

U.S. PATENT DOCUMENTS

| | | | | |
|---|---|---|---|---|
| 6,333,993 | B1* | 12/2001 | Sakamoto | G06T 7/194 358/464 |
| 6,404,916 | B1* | 6/2002 | De La Torre-Bueno | G06K 9/00127 382/162 |
| 8,781,222 | B2* | 7/2014 | Ferguson | H04N 9/73 382/162 |
| 9,449,252 | B1* | 9/2016 | Usikov | G06T 5/00 |
| 2002/0126872 | A1* | 9/2002 | Brunk | G06K 9/00744 382/100 |
| 2004/0264741 | A1* | 12/2004 | Omatsu | G06K 9/00234 382/115 |
| 2007/0104363 | A1* | 5/2007 | Yoshiura | G06T 7/90 382/165 |
| 2007/0267570 | A1* | 11/2007 | Park | A47L 9/009 250/221 |
| 2010/0073502 | A1* | 3/2010 | An | G06T 7/248 348/222.1 |
| 2011/0038535 | A1* | 2/2011 | Wang | H04N 9/735 382/164 |
| 2011/0235855 | A1* | 9/2011 | Smith | G06F 3/0304 382/103 |
| 2014/0071131 | A1* | 3/2014 | Kitago | G06T 17/00 345/427 |
| 2015/0036924 | A1* | 2/2015 | Kuusisto | G06K 9/4638 382/165 |
| 2015/0138534 | A1* | 5/2015 | Tidhar | F41G 3/147 356/51 |
| 2016/0093039 | A1 | 3/2016 | Xue et al. | |

FOREIGN PATENT DOCUMENTS

| | | |
|---|---|---|
| CN | 103488987 | 1/2014 |
| CN | 103839032 | 6/2014 |
| CN | 104266673 | 1/2015 |
| CN | 102799861 | 7/2015 |
| JP | S-5999581 | 6/1984 |
| JP | H-06259678 | 9/1994 |
| JP | H-11281325 | 10/1999 |
| JP | 2006/011608 | 1/2006 |
| WO | WO-2011/002524 | 1/2011 |

OTHER PUBLICATIONS

First Examination Report for CN 201410503931.3, dated Mar. 14, 2016, 6 pages (Including English Translation).

* cited by examiner

METHOD FOR MONITORING, IDENTIFICATION, AND/OR DETECTION USING A CAMERA BASED ON A COLOR FEATURE

CROSS-REFERENCE TO RELATED APPLICATIONS

This application claims priority to Chinese Patent Application No. 201410502643.6, filed on Sep. 26, 2014, published as CN 104298970 A on Jan. 21, 2015, the content of which is incorporated by reference herein in its entirety for all purposes.

TECHNICAL FIELD

The present disclosure relates to a method for identification and detection, and in particular aspects, relates to a method for identifying and/or detecting an object using a camera, based on one or more color features of the object. In some aspects, the present disclosure relates to devices and methods for identification and/or detection of a reaction unit on a chip or array and/or a property of the reaction unit.

BACKGROUND

In recent years, with the development of economy and society, more and more detections are required. Developments in material science, manufacturing technology, and microelectronics have spurred the advancement and widespread use of chip technology. Detection methods using chips, in particular, biochips, can greatly reduce the cost of medical testing and have extra advantages such as high-throughput and easy-integration.

Traditional detection methods include manual detection and automatic detection. For manual detection, detection of multiple objects often comes with low-efficiency, high-labor cost, and high-error rate. For automatic detection, in order to ensure multiple objects correctly enter the detection area to be examined there, a variety of parameters such as velocity, position, displacement, and angle of rotation must be specified for the objects. These specific conditions require precision and complex instruments. In addition, the complex instruments are often costly and bulky. Once an object and/or detector deviate from a programmed detection procedure, the detection results could contain serious deviations or mistakes.

SUMMARY

The summary is not intended to be used to limit the scope of the claimed subject matter. Other features, details, utilities, and advantages of the claimed subject matter will be apparent from the detailed description including those aspects disclosed in the accompanying drawings and in the appended claims.

In one aspect, provided herein is a method for monitoring the movement of an object using a camera system. In some embodiments, the method comprises measuring the color characteristic value (CCV) of each pixel of a camera field of view of a camera system, and the mean CCV of the pixels of the camera field of view is set as a threshold CCV. In one embodiment, the method further comprises moving an object across the camera field of view. In any of the preceding embodiments, the method can further comprise measuring the real-time mean CCV of the pixels within the camera field of view as the object moves across the camera field of view, and the real-time mean CCV being equal to the threshold CCV indicates that the object has not entered or has already completely left the camera field of view, and the real-time mean CCV being greater or smaller than the threshold CCV indicates that the object has entered and has not completely left the camera field of view.

In any of the preceding embodiments, the object can have a CCV that identifies the object. In any of the preceding embodiments, the object can comprise a chip. In any of the preceding embodiments, the chip can comprise a substrate and one or more units on the substrate. In any of the preceding embodiments, each of the one or more units can have a CCV that identifies the unit. In any of the preceding embodiments, the method can further comprise generating an oscillogram of the real-time mean CCV plotted against time, and the oscillogram can comprise a waveform, and the appearance and disappearance of the waveform as the object moves across the camera field of view can indicate detection of the object. In any of the preceding embodiments, the waveform can comprise a peak or a valley. In any of the preceding embodiments, the object can be moved in a straight line across the camera field of view. In any of the preceding embodiments, at least two objects can be sequentially moved across the camera field of view, and the distance between the two objects and the time interval between the peak or valley of the waveforms of the two objects can be used to calculate the average speed of the objects moving across the camera field of view.

In any of the preceding embodiments, at least two objects can be sequentially moved across the camera field of view, and the speed of the objects moving across the camera field of view and the time interval between the peak or valley of the waveforms of the two objects can be used to calculate the distance between the two objects.

In any of the preceding embodiments, the object can be moved in a curve across the camera field of view. In any of the preceding embodiments, the object can be moved in a circle at an even speed. In any of the preceding embodiments, at least two objects can be sequentially moved across the camera field of view, and the time for each of the objects to rotate the full circle and the time interval between the peak or valley of the waveforms of two objects can be used to calculate the angle between the two objects on the circle.

In any of the preceding embodiments, the generation of the oscillogram can comprise wave filtering. In any of the preceding embodiments, the camera system can further comprise an image processing unit and/or a display unit in addition to the camera.

In any of the preceding embodiments, the method can further comprise initializing the camera and/or the image processing unit.

In any of the preceding embodiments, the object can completely cover the camera field of view. In one aspect, when the object completely covers the camera field of view, the real-time mean CCV of the camera field of view is the mean CCV of the object.

In any of the preceding embodiments, the object can comprise a unit comprising a sample comprising an analyte, and the mean CCV of the object can be correlated with a property of the sample. In some embodiments, the property of the sample is the concentration of the analyte in the sample, and the mean CCV of the object is used to determine the concentration of the analyte in the sample.

In any of the preceding embodiments, the camera can measure the real-time CCVs of pixels of the camera field of view, and the image processing unit can generate the real-time mean CCV of the camera field of view and transmit the real-time mean CCV to the display unit.

In any of the preceding embodiments, the camera can measure the CCVs of pixels of the camera field of view when the object is outside the camera field of view, and the image processing unit can generate the mean CCV of the pixels of the camera field of view and transmit the mean CCV to the display unit as the threshold CCV.

In any of the preceding embodiments, the object can comprise a chip comprising one or more reaction units, and the CCV of each reaction unit can identify the type of reaction in the reaction unit.

In any of the preceding embodiments, the CCV of the object can be a mean CCV of the object.

In any of the preceding embodiments, the oscillogram can comprise a waveform, and the appearance and disappearance of the waveform as the object moves across the camera field of view can indicate detection of the object, and the waveform has a peak or valley value indicating the mean CCV of the object.

In any of the preceding embodiments, the object can comprise a unit comprising a sample comprising an analyte, and the mean CCV of the object can be correlated with a property of the sample. In some embodiments, the property of the sample is the concentration of the analyte in the sample, and the mean CCV of the object is used to determine the concentration of the analyte in the sample.

In any of the preceding embodiments, the object can be of a single color, multiple colors, or a color pattern. In any of the preceding embodiments, the object can comprise a plurality of units, and units of the same type can be identified by the same or substantially the same CCV.

In any of the preceding embodiments, the plurality of units can be reaction units, and units of the same type of reaction can be identified by the same or substantially the same CCV.

In some aspects, two CCVs are substantially the same when the CCVs are less than about 50%, less than about 40%, less than about 30%, less than about 20%, less than about 15%, less than about 10%, less than about 5%, less than about 2%, less than about 1%, less than about 0.5%, less than about 0.1%, or less than about 0.01% different from each other in value.

In any of the preceding embodiments, the reaction can involve an analyte selected from the group consisting of an amino acid, a peptide, a protein, a nucleoside, a nucleotide, an oligonucleotide, a nucleic acid, a vitamin, a monosaccharide, an oligosaccharide, a carbohydrate, a fatty acid, a lipid, an ion, an organic or inorganic compound, a drug, a pro-drug, a drug metabolite, a subcellular analyte, an organelle, a cell, a multicellular organism, a microorganism, a virus, a prion, a bacterium, a fungus, and a multicomponent complex containing any of the above.

In any of the preceding embodiments, the reaction can be used for detecting and/or measuring the level of the analyte in a sample. In some aspects, the sample is a biological sample.

In any of the preceding embodiments, the mean CCV can be the average of CCVs of all the pixels of an image captured by the camera in the same color mode, and the color mode can be selected from the group consisting of RGB, HSB, CMYK, Grayscale, Lab, and any combination thereof. In any of the preceding embodiments, the real-time mean CCV can be the average of real-time CCVs of all the pixels of an image captured by the camera in the same color mode, and the color mode is selected from the group consisting of RGB, HSB, CMYK, Grayscale, Lab, and any combination thereof.

DETAILED DESCRIPTION

Figure 1:
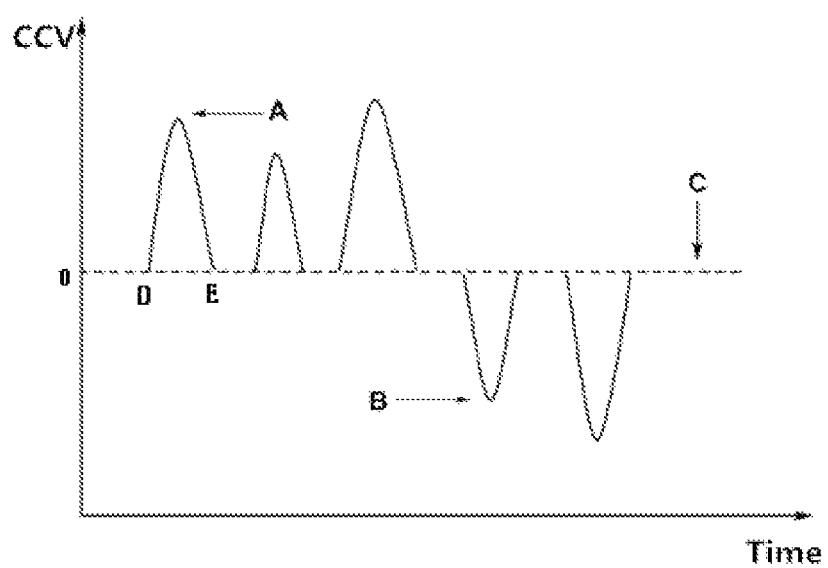
FIG. 1 shows waveforms formed by data from real-time detection of color features by a camera.

A detailed description of one or more embodiments of the claimed subject matter is provided below along with accompanying figures that illustrate the principles of the claimed subject matter. The claimed subject matter is described in connection with such embodiments, but is not limited to any particular embodiment. It is to be understood that the claimed subject matter may be embodied in various forms, and encompasses numerous alternatives, modifications and equivalents. Therefore, specific details disclosed herein are not to be interpreted as limiting, but rather as a basis for the claims and as a representative basis for teaching one skilled in the art to employ the claimed subject matter in virtually any appropriately detailed system, structure, or manner. Numerous specific details are set forth in the following description in order to provide a thorough understanding of the present disclosure. These details are provided for the purpose of example and the claimed subject matter may be practiced according to the claims without some or all of these specific details. It is to be understood that other embodiments can be used and structural changes can be made without departing from the scope of the claimed subject matter. It should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. For the purpose of clarity, technical material that is known in the technical fields related to the claimed subject matter has not been described in detail so that the claimed subject matter is not unnecessarily obscured.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art.

All publications referred to in this application are incorporated by reference in their entireties for all purposes to the same extent as if each individual publication were individually incorporated by reference.

All headings are for the convenience of the reader and should not be used to limit the meaning of the text that follows the heading, unless so specified.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6.

As used herein, the singular forms "a", "an", and "the" include plural references unless indicated otherwise. For example, "an" object includes one or more objects.

It is understood that aspects and embodiments of the disclosure described herein include "consisting" and/or "consisting essentially of" aspects and embodiments.

Other objects, advantages and features of the present disclosure will become apparent from the following specification taken in conjunction with the accompanying drawings.

In some aspects, the present disclosure provides a method for camera-based identification and/or detection based on one or more color features of an object. In one embodiment, the method detects and/or identifies one or more objects in a detection area, such as a camera field of view. In another embodiment, the method comprises obtaining a color value, such as a CCV (color characteristic value) or a mean CCV, of the detection area. In one aspect, the object comprises a reaction area, and the color value of the reaction area of the object can be determined and used to detect and/or identify the type of reaction or a property of the object.

To achieve the above purpose, in some aspects, the present disclosure takes the technical scheme described below. In a first aspect, a method for camera-based identification and/or detection based on a color feature is provided, and the method comprises:

1) starting the camera, the image processing unit, and the display unit of a camera system.

2) using the camera to capture the color pixels of the background of a camera field of view (i.e., the detection area). The data are then sent to the image processing unit. The image processing unit then extracts the color characteristic value from each pixel of the background and calculates the mean color characteristic value of the background, which is set as a threshold value and sent to the display unit.

3) moving one or more objects (which may include control objects with known color characteristic values, and/ or untested objects) to the detection area of the camera. The object(s) can be moved slowly and gradually, for example, at an even speed (in case the movement is linear, e.g., along a straight line) or at an even speed of revolution (in case the object rotates around an axis). Rotational speed (or speed of revolution) of an object rotating around an axis is the number of turns of the object divided by time, specified as revolutions per minute (rpm), revolutions per second (rev/s), or radians per second (rad/s). Rotational speed is equal to the angular velocity to divided by $2\pi$.

In some aspects, the camera captures the color pixels of the detection area in real-time as the object is moved across the detection area. The data of the color pixels are then sent to the image processing unit. The image processing unit extracts the mean real-time color characteristic value from the color pixels of the detection area and sends it to the display unit. When the object starts to enter the detection area (e.g., at a constant speed or rotational speed), completely enters the detection area, starts to exist the detection area, and then completely exists the detection area of the camera, the display unit will show a waveform of the real-time color characteristic value plotted against time. The mean color characteristic values detected from the detection area can be used as follows.

1) In one aspect, if the real-time mean color characteristic value of the detection area is equal to the threshold, then the object is not in the detection area. For example, the object has not started to enter the detection area, or has completely left the detection area (for example, FIG. 1, from point O to point D).

2) In one aspect, if the real-time mean color characteristic value of the detection area is greater than the threshold, then the object to be detected has at least partially entered the camera detection area. In this case, the color characteristic value (CCV) or mean CCV of the object is greater than the threshold. For example, when the object has started to enter the detection area but has not yet completely entered the detection area, this phase corresponds to the upward phase of the waveform. When the object has completely entered the detection area and has not started to exit the detection area, the waveform will plateau and/or reach a peak (for example, shown as A in FIG. 1). The peak value may stay constant as long as the camera field of view remains completely covered by the object (in cases where the object is capable of completely covering the camera field of view), or as long as the object remains completely within the camera field of view (in cases where the object is smaller than the camera field of view, and is capable of completely staying within the camera field of view). When the object has started to exit the detection area but has not completely left the detection area, the waveform will go downward and reach the threshold value when the object has completely exited the detection area.

In one aspect, the data of the real-time mean color characteristic value of the detection area are processed by wave filtering. In some embodiments, when the real-time mean color characteristic value is greater than the threshold value, after filtering out the threshold value (i.e., subtracting the threshold value from the real-time mean color characteristic value), the waveform has a maximum value (i.e., a peak value). In some aspects, the peak value is the color characteristic value of the object. In other aspects, the color characteristic value of the object can be determined based on the peak value. In some aspects, when the display unit displays a waveform from its appearance to its disappearance, it is considered that an object is detected (for example, FIG. 1, from point D to point E).

In one aspect, when the object enters the detection area and completely covers the camera detection area, the maximum mean color characteristic value (the peak value of the waveform) is read as the mean color characteristic value of the object.

In another aspect, when the object completely enters the camera detection area but does not completely cover the detection area, the mean color characteristic value of the object can nonetheless be determined from the peak value of the waveform, for example, by using proper controls.

3) In one aspect, if the real-time mean color characteristic value of the detection area is less than the threshold, then the object to be detected has at least partially entered the camera detection area. In this case, the color characteristic value (CCV) or mean CCV of the object is less than the threshold. For example, when the object has started to enter the detection area but has not yet completely entered the detection area, this phase corresponds to the downward phase of the waveform. When the object has completely entered the detection area and has not started to exit the detection area, the waveform will reach the bottom of a valley (for example, shown as B in FIG. 1). The valley value may stay constant as long as the camera field of view remains completely covered by the object (in cases where the object is capable of completely covering the camera field of view), or as long as the object remains completely within the camera field of view (in cases where the object is smaller than the camera field of view, and is capable of completely staying within the camera field of view). When the object has started to exit the detection area but has not completely left the detection area, the waveform will go upward and reach the threshold value when the object has completely exited the detection area.

In one aspect, the data of the real-time mean color characteristic value of the detection area are processed by wave filtering. In some embodiments, when the real-time mean color characteristic value is less than the threshold value, after filtering out the threshold value (i.e., subtracting the threshold value from the real-time mean color characteristic value), the waveform has a minimum value (i.e., a valley value). In some aspects, the valley value is the color characteristic value of the object. In other aspects, the color characteristic value of the object can be determined based on the valley value. In some aspects, when the display unit displays a waveform from its appearance to its disappearance, it is considered that an object is detected.

In one aspect, when the object enters the detection area and completely covers the camera detection area, the minimum mean color characteristic value (the valley value of the waveform) is read as the mean color characteristic value of the object.

In another aspect, when the object completely enters the camera detection area but does not completely cover the detection area, the mean color characteristic value of the object can nonetheless be determined from the valley value of the waveform, for example, by using proper controls.

Because the color characteristic value of a reaction unit and the concentration of an analyte in the reaction unit can correlate with each other, the analyte concentration in the reaction unit can be determined based on the detected color characteristic value of the reaction unit. A series of samples containing known concentrations of an analyte can be used to calibrate the system, for example, to generate a standard curve or a formula describing the relationship between analyte concentrations and color characteristic values. Similarly, other properties of the object, such as temperature or an optic property, can be determined using the detected color characteristic value of the object.

In one aspect, the mean color characteristic value is the average of at least 10%, 20%, 30%, 40%, 50%, 60%, 70%, 80%, 90%, or all the pixels in the same channel of a color mode, from an image detected by the camera. The channel of the color mode can include RGB, HSB, CMYK, Grayscale, and Lab, and one or more combinations thereof.

In one aspect, using the real-time detection by a camera, if the distance (D) between two objects is known, and the time interval (t) between the peak values (or between the valley values, or between a peak value and a valley value, or between a valley value and a peak value) is known, the mean moving speed of the objects (v) can be calculated based on the known values, for example according to the formula $v=D/t$. The valley and/or peaks can be immediately next to each other, or separated by one or more other valleys and/or peaks; in other words, the objects can be immediately next to each other in the order they are moved across the camera field of view, or separated by one or more other objects. In some aspects, the time interval (t) between two peak values is the time interval between the mid-point of one peak and the mid-point of the other peak. Similarly, the time interval (t) between two valley values is the time interval between the mid-point of one valley and the mid-point of the other valley. When a first object has a mean CCV greater than the threshold (thus a peak would be generated for the first object) and a second object has a mean CCV less than then the threshold (thus a valley would be generated for the second object), the time interval between the peak and the valley is the time interval between the mid-point of the peak and the mid-point of the valley.

In one aspect, using the real-time detection by a camera, if the linear moving speed (v) is known, and the time interval (t) between the peaks (or between the valleys, or between a peak and a valley, or between a valley and a peak) is known, the distance (D) between the objects can be calculated, for example, by $D=vt$. The valley and/or peaks can be immediately next to each other, or separated by one or more other valleys and/or peaks; in other words, the objects can be immediately next to each other in the order they are moved across the camera field of view, or separated by one or more other objects.

In some aspects, the time interval (t) between two peaks is the time interval between the mid-point of one peak and the mid-point of the other peak. For example, if one peak plateaus between time points (T1, T2) and the other peak plateaus between time points (T3, T4), the time interval between the two peak is $t=[(T4-T3)/2]-[(T2-T1)/2]$. Similarly, the time interval (t) between two valley values is the time interval between the mid-point of one valley and the mid-point of the other valley. The time interval (t) between one valley and one peak is the time interval between the mid-point of the valley and the mid-point of the peak.

In another aspect, using the real-time detection by a camera, one or more objects are in a circular motion and are moved across the detection area at a uniform speed. If the time for an object to complete one circle is known as T, and the time interval (t) between peaks and/or valleys (or between a peak and a valley) of the waveforms of the two objects is known, the angle of rotation ($\theta$) between the two objects can be calculated, for example, by $\theta=2\pi t/T$.

In some aspects, the presently disclosed methods have at least the following advantages:

1) the camera captures the color pixels of the detection area and sends the data to the image processing unit. The image processing unit extracts color characteristic value from each pixel value of the detection area and calculates the mean color characteristic value of the detection area. After filtering, the value of a peak or a valley can be obtained. Then, whether the object is in the detection area can be determined. Therefore, in some aspects of the presently disclosed methods, the detection area remains unaffected by environment factors, and precise positioning and contraposition of the objects are not necessary.

2) The color characteristic value of a sample can be correlated with a variety of properties of the sample, such as the temperature of the sample, the concentration of one or more analytes in the sample, or an optical property of the sample (e.g., fluorescence, light transmission, reflection, absorption, refraction, or diffraction). Therefore, the color characteristic value of an object can be used to determine a property of the object, using a method disclosed herein.

3) In some aspects, no expensive or bulky detector is required of a method disclosed herein, and the measurement can be readily repeated and costs less.

4) In one aspect, detection and analysis using a method disclosed herein do not require physically contacting the sample with a detector or a probe. Therefore, a method disclosed herein is safe and/or avoids or reduces contamination of the sample during the analysis.

In one aspect, the present disclosure relates to a method of using a camera for the identification and/or detection of an object based on a color feature of the object. The camera captures the color pixel of the detection area and sends it to the image processing unit. The image processing unit extracts color characteristic value from each pixel value of the detection area and calculates the mean color characteristic value of the detection area. After filtering, the peak or valley value can be obtained, and then whether the untested object is in the detection area can be determined. Because the color characteristic value of a sample can be correlated with a variety of properties of the sample, the color characteristic value of an object can be used to determine a property of the object, using a method disclosed herein.

In one aspect, the present disclosure relates to a method for using a camera to detect and/or identify a color feature, the method comprising: 1) starting the camera, the image processing unit and the display unit at the beginning of testing; 2) using the camera to capture the color pixel of background in the detection area, wherein the data are sent to the image processing unit, which extracts color characteristic value from each pixel value of background, calculates the mean color characteristic value of the background as the threshold value (FIG. 1, C), and sends it to the display unit; 3) moving an untested object to the detection area of the camera, wherein the camera captures the color pixel of detection area and sends it to the image processing unit, which extracts the mean color characteristic value from the color pixel of the detection area and sends it to the display unit.

In some embodiments, the background color of the detection area is a single color.

In some embodiments, a series of peaks and/or valleys appear on the display unit, as shown in FIG. 1. Each peak or valley indicates the detection of an object, as the objects are sequentially moved across the detection area. The objects can be located on the same structure or on different structures. For example, the objects can be reaction units on the same biochip or on different biochips.

In some embodiments, the mean color characteristic value is the average of at least 10%, 20%, 30%, 40%, 50%, 60%, 70%, 80%, 90%, or all the pixels in the same channel of the color mode from an image detected by a camera. The channel of the color mode includes RGB (red, green, blue), HSB (hue, saturation, brightness), CMYK (cyan, magenta, yellow, black), Grayscale, and Lab (L represents the lightness channel; a and b indicate the color channel), or the color modes in one or more combinations.

When the color characteristic value is known, many physical quantities can be obtained indirectly. For example, under real-time detection of the camera, if the distance and the time interval between peaks or valleys (or between a peak and a valley) of the waveforms of the two untested objects are known, the mean moving speed can be calculated. In some embodiments, the objects are located on the same carrier structure are moved together across the detection field along with the common carrier structure.

In another example, under real-time detection of the camera, if the linear moving speed and the time interval between peaks or valleys (or between a peak and a valley) of the waveforms of the two untested objects are known, the distance between the objects can be calculated.

In a third example, under real-time detection of the camera, the untested object is in a circular motion at a uniform speed. In some embodiments, the objects are located on the same carrier structure are moved together across the detection field along with the common carrier structure, which undergoes a circular motion. When the time interval between peaks or valleys (or between a peak and a valley) of the waveforms of the two untested objects is known, the angle of rotation between the objects can be calculated, if the time for the carrier structure (such as a disk) to complete one circle is also known.

In a first aspect, disclosed herein is a method for detecting and/or analyzing an object using a camera system. In some embodiments, the method comprises measuring the color characteristic value (CCV) of each pixel of a camera field of view of a camera system, and the mean CCV of the pixels of the camera field of view is set as a threshold CCV. In one embodiment, the method further comprises moving an object across the camera field of view. In another embodiment, the method further comprises measuring the real-time mean CCV of the pixels within the camera field of view as the object moves across the camera field of view to generate an oscillogram of the real-time mean CCV plotted against time. In any of the preceding embodiments, the real-time mean CCV being equal to the threshold CCV can indicate that the object has not entered or has already completely left the camera field of view. In any of the preceding embodiments, the real-time mean CCV being greater or less than the threshold CCV can indicate that the object has entered and has not completely left the camera field of view.

In any of the preceding embodiments, the object can have a CCV that identifies the object. In any of the preceding embodiments, the object can comprise a chip. In any of the preceding embodiments, the object can be a chip comprising a substrate and one or more units on the substrate. In any of the preceding embodiments, each of the one or more units can have a CCV that identifies the unit.

In any of the preceding embodiments, the oscillogram can comprise a waveform, and the appearance and disappearance of the waveform as the object moves across the camera field of view can indicate detection of the object. In any of the preceding embodiments, the waveform can comprises a peak or a valley. In any of the preceding embodiments, the object can be moved in a straight line across the camera field of view.

In any of the preceding embodiments, at least two objects can be sequentially moved across the camera field of view, and the distance between the two objects and the time interval between the peak or valley of the waveforms of the two objects can be used to calculate the average speed of the objects moving across the camera field of view.

In any of the preceding embodiments, at least two objects can be sequentially moved across the camera field of view, and the distance between the two adjacent objects and the time interval between the peak or valley of the waveforms of the two adjacent objects can be used to calculate the average speed of the objects moving across the camera field of view.

In any of the preceding embodiments, at least two objects can be sequentially moved across the camera field of view, and the speed of the objects moving across the camera field of view and the time interval between the peak or valley of the waveforms of the two objects can be used to calculate the distance between the two objects.

In any of the preceding embodiments, at least two objects can be sequentially moved across the camera field of view, and the speed of the objects moving across the camera field of view and the time interval between the peak or valley of the waveforms of the two adjacent objects can be used to calculate the distance between the two adjacent objects.

In any of the preceding embodiments, the object can be moved in a curve across the camera field of view, or in a circle at an even speed. In any of the preceding embodiments, at least two objects can be sequentially moved across the camera field of view, and the time for each of the objects to rotate the full circle and the time interval between the peak or valley of the waveforms of the two objects can be used to calculate the angle between the two objects on the circle. In any of the preceding embodiments, at least two objects can be sequentially moved across the camera field of view, and the time for each of the objects to rotate the full circle and the time interval between the peak or valley of the waveforms of the two adjacent objects can be used to calculate the angle between the two adjacent objects on the circle.

In any of the preceding embodiments, the generation of the oscillogram can comprise wave filtering.

In any of the preceding embodiments, the camera system can further comprise an image processing unit and/or a display unit in addition to the camera. In any of the preceding embodiments, the method can further comprising initializing the camera and/or the image processing unit.

In any of the preceding embodiments, the object can completely cover the camera field of view. In some embodiments, when the object completely covers the camera field of view, the real-time mean CCV of the camera field of view is the mean CCV of the object. In any of the preceding embodiments, the object can comprise a unit comprising a sample comprising an analyte, and the mean CCV of the object can be correlated with a property of the sample. In some embodiments, the property of the sample is the concentration of the analyte in the sample, and the mean CCV of the object is used to determine the concentration of the analyte in the sample.

In any of the preceding embodiments, the camera can measure the real-time CCVs of pixels of the camera field of view, and the image processing unit can generate the real-time mean CCV of the camera field of view and transmit the real-time mean CCV to the display unit.

In any of the preceding embodiments, the camera can measure the CCVs of pixels of the camera field of view when the object is outside the camera field of view, and the image processing unit can generate the mean CCV of the pixels of the camera field of view and transmit the mean CCV to the display unit as the threshold CCV.

In any of the preceding embodiments, the object can comprise a chip comprising one or more reaction units, and the CCV of each reaction unit can identify the type of reaction in the reaction unit.

In any of the preceding embodiments, the CCV of the object can be a mean CCV of the object. In any of the preceding embodiments, the oscillogram can comprise a waveform, and the appearance and disappearance of the waveform as the object moves across the camera field of view can indicate detection of the object, and the waveform can have a peak or valley value indicating the mean CCV of the object.

In any of the preceding embodiments, the object can comprise a unit comprising a sample comprising an analyte, and the mean CCV of the object can be correlated with a property of the sample. In some embodiments, the property of the sample is the concentration of the analyte in the sample, and the mean CCV of the object is used to determine the concentration of the analyte in the sample.

In any of the preceding embodiments, the object can be of a single color, multiple colors, or a color pattern. In any of the preceding embodiments, the object can comprise a plurality of units, and units of the same type can be identified by the same or substantially the same CCV. For example, the object can comprise between about 1 and about 5 units, between about 5 and about 50 units, between about 50 and about 500 units, between about 500 and about 1000 units, or more than about 1000 units. The units can be of the same or different types, for example, the units can be used for the same or different chemical or biological reactions. In any of the preceding embodiments, the plurality of units can be reaction units, and units of the same type of reaction can be identified by the same or substantially the same CCV. In any of the preceding embodiments, the reaction can involve an analyte selected from the group consisting of an amino acid, a peptide, a protein, a nucleoside, a nucleotide, an oligonucleotide, a nucleic acid, a vitamin, a monosaccharide, an oligosaccharide, a carbohydrate, a fatty acid, a lipid, an ion, an organic or inorganic compound, a drug, a pro-drug, a drug metabolite, a subcellular analyte, an organelle, a cell, a multicellular organism, a microorganism, a virus, a prion, a bacterium, a fungus, and a multicomponent complex containing any of the above. In any of the preceding embodiments, the reaction can be used for detecting and/or measuring the level of the analyte in a sample. In any of the preceding embodiments, the sample can be a biological sample.

In any of the preceding embodiments, the mean CCV can be the average of CCVs of at least 10%, 20%, 30%, 40%, 50%, 60%, 70%, 80%, 90%, or all the pixels (or selected pixels) of an image captured by the camera in the same color mode, and the color mode is selected from the group consisting of RGB, HSB, CMYK, Grayscale, Lab, and any combination thereof. In any of the preceding embodiments, the real-time mean CCV can be the average of real-time CCVs of at least 10%, 20%, 30%, 40%, 50%, 60%, 70%, 80%, 90%, or all the pixels (or selected pixels) of an image captured by the camera in the same color mode, and the color mode is selected from the group consisting of RGB, HSB, CMYK, Grayscale, Lab, and any combination thereof.

The following examples are offered to illustrate but not to limit the disclosure.

Example 1

In this example, a CMOS camera is used to define and detect strips which have color reaction units on them. There are several color reaction units on each strip, and each color reaction unit is reacted by dropping on it a sample containing an analyte to be detected. After reaction, the analyte in each sample causes a color change in the corresponding reaction unit on the test strip. The color of each reaction unit after reaction is correlated with the concentration of the analyte in the sample dropped on the reaction unit. The identification and detection of the analyte based on color features include following steps:

1) The camera, the image processing unit and the display unit are started at the beginning of the analysis.

2) The camera captures color characteristic value A of the color pixel by channel M (CMYK color model) of the background of the strip, and value A is set as the threshold value.

Figure 2:
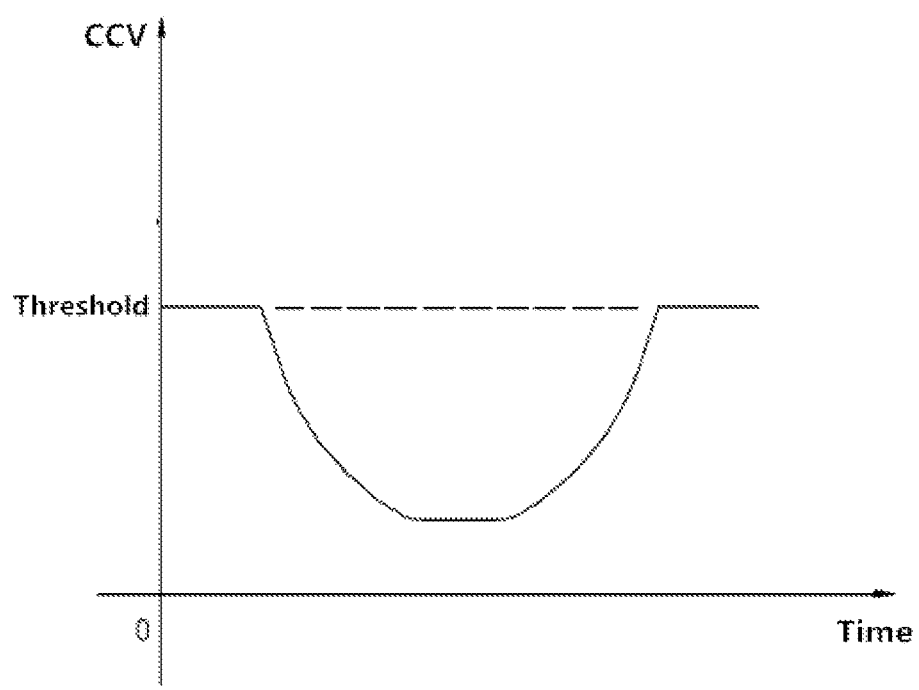
FIG. 2 shows a waveform according to Example 1.

3) The strip is moved to the detection area of the camera after reaction. The camera captures the color pixel of the detection area and sends the data to the image processing unit. The image processing unit extracts the mean color characteristic value M from the color pixel of the detection area. Then the valley value is sent to the display unit after filtering (shown in FIG. 2). The oscillogram appears when a color unit enters the detection area and the mean value of the valleys or peaks is considered as value M of color reaction unit when the color reaction area (the object to be detected here) is larger than the detection area.

4) The concentration of untest sample can be obtained by using value M and calculating by a formula.

5) When the color characteristic value is known, many physical quantities can be obtained indirectly. Under real-time detection of the camera, if the distance between two reaction units and the time interval between peaks or valleys (or between a peak and a valley) of the waveforms of the two reaction units are known, the mean moving speed of the reaction units can be calculated. Under real-time detection of the camera, if the linear moving speed and the time interval between peaks or valleys (or between a peak and a valley) of the waveforms of the two reaction units are known, the distance between the reaction units can be calculated.

Example 2

In this example, a CMOS camera is used to detect a chip which has reaction units on it. The chip comprises a transparent substrate, and the color of the transparent substrate is set as the background color. The image processing unit extracts the mean color characteristic value from RGB color model, and the color characteristic values of transparent background are (R:65, G:180, B:32). There are several reaction units on the chip, and each reaction unit comprises an agent that can react with an analyte to be detected in sample. Each of the reaction units is reacted by dropping on it a sample containing the analyte to be detected. A red color can be detected following the reaction. The analyte concentration of the sample dropped in each reaction unit is correlated with the color characteristic value of the reaction unit. In one aspect, the color characteristic values of a reaction unit after reaction are (R:80, G:120, B:25), and the reaction unit area is larger than the camera detection area, such that the reaction unit area can completely cover the camera detection area.

1) Starting the camera, the image processing unit and the display unit at the beginning of testing.

2) Moving a non-detection area (blank area on the substrate of the chip) to the camera detection area, wherein the image processing unit extracts value G from the non-detection area and sets the value G as threshold $G_0$ and sends it to the display unit.

Figure 3:
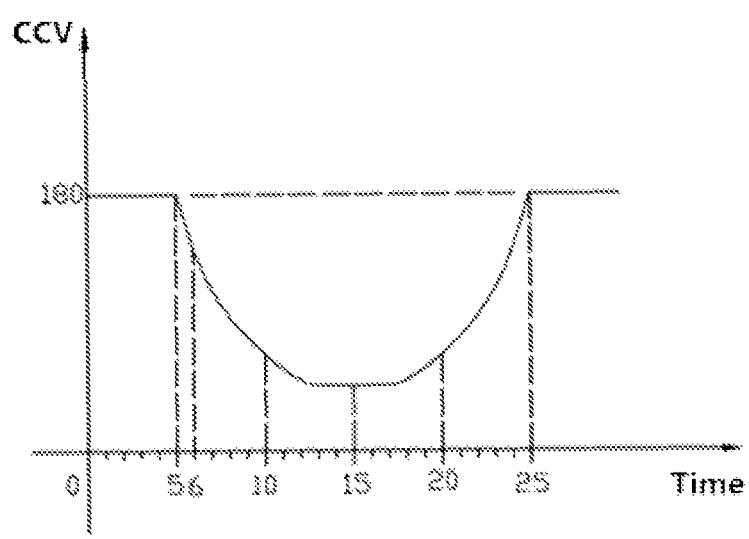
FIG. 3 shows a waveform according to Example 2.

3) Moving the reaction units to the camera detection area. The image processing unit extracts value G from the detection area and sends the data to the display unit in real-time manner (shown in FIG. 3). The color characteristic values G are shown in the Table 1 at the different time points.

TABLE 1

| Color characteristic values G at different time points | | | | | | |
|---|---|---|---|---|---|---|
| Time (s) | | | | | | |
| 0 | 5 | 6 | 10 | 15 | 20 | 25 |
| G | 180 | 180 | 178 | 140 | 120 | 140 | 180 |

4) The image processing unit compares value $G_0$ (180) and real time value G to determine whether color reaction unit has entered into the detection area.

As shown in Table 1, the reaction unit does not enter the detection area until 5 seconds after starting the analysis. The reaction unit then enters the detection area and the image processing unit sends the results to the display unit.

5) The oscillogram and valley value are obtained when the value G are filtered by the image processing unit from 5 s to 25 s. Because the reaction unit area is larger than the detection area, the valley value (G=120) can be considered as the color characteristic value of reaction unit. Then the image processing unit sends the results to the display unit.

The relationship between the color characteristic value G and the concentration Y of an analyte in the untested sample is:

$$Y = 3G + 363 \qquad (1)$$

6) When another color reaction unit enters the detection area, step 3) to step 5) can be repeated. Then the color characteristic value of each reaction unit can be determined and used to calculate the concentration of an analyte in the sample in the reaction unit according to formula (1).

7) When the color characteristic value is known and under real-time detection of the camera, if the distance and the time interval between peaks or valleys (or between a peak and a valley) of the waveforms of the two reaction units are known, the mean moving speed can be calculated. Under real-time detection of the camera, if the moving speed and the time interval between peaks or valleys (or between a peak and a valley) of the waveforms of the two reaction units are known, the distance between the reaction units can be calculated. Under real-time detection of the camera, the chip can be in a circular motion at a uniform speed. For example, the chip can be a round disk rotating around its center. The time for the chip to complete one circle can be determined. When the time interval between peaks or valleys (or between a peak and a valley) of the waveforms of the two reaction units are known, the angle of rotation between the two reaction units on the disk-shaped chip can be calculated.

Additional embodiments are provided below.

Embodiment 1

A method for camera identification and detection on color features, comprising:

1) starting the camera, the image processing unit and the display unit at the beginning of testing;

2) using the camera to capture the color pixel of background in the detection area and send it to the image processing unit, which extracts color characteristic value from each pixel value of background and calculates the mean color characteristic value of the background, which is set as the threshold value and sent to the display unit;

3) moving the untested object to the detection area of camera slowly and gradually, wherein the camera captures the color pixel of the detection area and sends it to the image processing unit, which extracts the mean color characteristic value from the color pixel of detection area and sends it to the display unit, and when the object accesses the detection area, completely enters the detection area, starts to exit the detection area, and completely leaves the detection area, the display unit shows a waveform of the mean real-time color characteristic values from detection area plotted against time, wherein:

a) if the real-time mean color characteristic value of detection area is equal to the threshold, then there is not an object in the detection area of camera;

b) If the real-time mean color characteristic value of detection area is greater than the threshold, then the object to be detected has entered into the camera detection area, wherein the data from the time point when the real-time mean color characteristic value (CCV) of the detection area starts to be greater than the threshold until when the mean CCV of the detection area becomes equal to the threshold are processed by wave filtering and the maximum value of the real-time mean CCV is set as a peak value, wherein the data shows the appearance and the disappearance of the waveform, indicating an object has been detected, wherein if the object completely covers the camera detection area, the maximum mean color characteristic value is the mean color characteristic value of the object;

c) If the real-time mean color characteristic value of detection area is less than the threshold, then the object to be detected has entered into the camera detection area, wherein the data from the time point when the real-time mean color characteristic value (CCV) of the detection area starts to be less than the threshold until when the mean CCV of the detection area becomes equal to the threshold are processed by wave filtering and the minimum value of the real-time mean CCV is set as a valley value, wherein the data shows the appearance and the disappearance of the waveform, indicating an object has been detected, wherein if the object completely covers the camera detection area, the minimum mean color characteristic value is the mean color characteristic value of the object.

Embodiment 2

A method according to Embodiment 1, when the mean color characteristic value of the object is determined, a property of the object, such as the concentration of an analyte comprised in the object, is determined based on the mean color characteristic value of the object, which is correlated with the property.

Embodiment 3

A method according to Embodiment 1, wherein in the step 2), the mean color characteristic value is the average of all the pixels in the same channel of the color mode from an image detected by the camera, wherein the channel of the color mode is RGB, HSB, CMYK, Grayscale, or Lab, or one or more combinations thereof.

Embodiment 4

A method according to Embodiment 2, wherein in the step 2), the mean color characteristic value is the average of all the pixels in the same channel of the color mode from the image detected by the camera, wherein the channel of the color mode is RGB, HSB, CMYK, Grayscale, or Lab, or one or more combinations thereof.

Embodiment 5

A method according to any one of Embodiments 1-4, wherein under real-time detection of the camera, if the distance and the time interval between peaks or valleys (or between a peak and a valley) of the waveforms of the two objects are known, the mean moving speed is calculated.

Embodiment 6

A method according to any one of Embodiments 1-5, wherein in step 3), under real-time detection of the camera, if the linear moving speed and the time interval between peaks or valleys (or between a peak and a valley) of the waveforms of the two objects are known, the distance between the objects is calculated.

Embodiment 7

A method according to any one of Embodiments 1-6, wherein under real-time detection of the camera, the object is in a circular motion at a uniform speed and the time for the object to complete one circle is known, if the time interval between peaks or valleys (or between a peak and a valley) of the waveforms of the two objects is known, the angle of rotation between the two objects is calculated.

The invention claimed is:

1. A method for monitoring the movement of an object using a camera system, comprising:
   1) measuring the color characteristic value (CCV) of each pixel of a camera field of view of a camera system, wherein the mean CCV of the pixels of the camera field of view is set as a threshold CCV;
   2) moving an object across the camera field of view; and
   3) measuring the real-time mean CCV of the pixels within the camera field of view as the object moves across the camera field of view,
   wherein the real-time mean CCV being equal to the threshold CCV indicates that the object has not entered or has already completely left the camera field of view, and wherein the real-time mean CCV being greater or smaller than the threshold CCV indicates that the object has entered and has not completely left the camera field of view.

2. The method of claim 1, wherein the object has a CCV that identifies the object.

3. The method of claim 1, wherein the object comprises a chip.

4. The method of claim 3, wherein the chip comprises a substrate and one or more units on the substrate.

5. The method of claim 4, wherein each of the one or more units has a CCV that identifies the unit.

6. The method of claim 1, further comprising generating an oscillogram of the real-time mean CCV plotted against time, wherein the oscillogram comprises a waveform, and the appearance and disappearance of the waveform as the object moves across the camera field of view indicate detection of the object.

7. The method of claim 6, wherein the waveform comprises a peak or a valley.

8. The method of claim 7, wherein the object is moved in a straight line across the camera field of view.

9. The method of claim 8, wherein at least two objects are sequentially moved across the camera field of view, and the distance between the two objects and the time interval between the peak or valley of the waveforms of the two objects are used to calculate the average speed of the objects moving across the camera field of view.

10. The method of claim 8, wherein at least two objects are sequentially moved across the camera field of view, and the speed of the objects moving across the camera field of view and the time interval between the peak or valley of the waveforms of the two objects are used to calculate the distance between the two objects.

11. The method of claim 1, wherein the object is moved in a curve across the camera field of view.

12. The method of claim 11, wherein the object is moved in a circle at an even speed.

13. The method of claim 12, wherein at least two objects are sequentially moved across the camera field of view, and the time for each of the objects to rotate the full circle and the time interval between the peak or valley of the waveforms of the two objects are used to calculate the angle between the two objects on the circle.

14. The method of claim 1, wherein the generation of the oscillogram comprises wave filtering.

15. The method of claim 1, wherein the camera system further comprises an image processing unit and/or a display unit in addition to the camera.

16. The method of claim 15, further comprising initializing the camera and/or the image processing unit.

17. The method of claim 1, wherein the object can completely cover the camera field of view.

18. The method of claim 17, when the object completely covers the camera field of view, the real-time mean CCV of the camera field of view is the mean CCV of the object.

19. The method of claim 18, wherein the object comprises a unit comprising a sample comprising an analyte, and the mean CCV of the object is correlated with a property of the sample.

20. The method of claim 19, wherein the property of the sample is the concentration of the analyte in the sample, and the mean CCV of the object is used to determine the concentration of the analyte in the sample.

21. The method of claim 15, wherein the camera measures the real-time CCVs of pixels of the camera field of view, and the image processing unit generates the real-time mean CCV of the camera field of view and transmits the real-time mean CCV to the display unit.

22. The method of claim 15, wherein the camera measures the CCVs of pixels of the camera field of view when the object is outside the camera field of view, and the image processing unit generates the mean CCV of the pixels of the camera field of view and transmits the mean CCV to the display unit as the threshold CCV.

23. The method of claim 1, wherein the object comprises a chip comprising one or more reaction units, and the CCV of each reaction unit identifies the type of reaction in the reaction unit.

24. The method of claim 2, wherein the CCV of the object is a mean CCV of the object.

25. The method of claim 24, wherein the oscillogram comprises a waveform, and the appearance and disappearance of the waveform as the object moves across the camera field of view indicate detection of the object, and the waveform has a peak or valley value indicating the mean CCV of the object.

26. The method of claim 25, wherein the object comprises a unit comprising a sample comprising an analyte, and the mean CCV of the object is correlated with a property of the sample.

27. The method of claim 26, wherein the property of the sample is the concentration of the analyte in the sample, and the mean CCV of the object is used to determine the concentration of the analyte in the sample.

28. The method of claim 1, wherein the object is of a single color, multiple colors, or a color pattern.

29. The method of claim 1, wherein the object comprises a plurality of units, and units of the same type are identified by the same or substantially the same CCV.

30. The method of claim 29, wherein the plurality of units are reaction units, and units of the same type of reaction are identified by the same or substantially the same CCV.

31. The method of claim 30, wherein the reaction involves an analyte selected from the group consisting of an amino acid, a peptide, a protein, a nucleoside, a nucleotide, an oligonucleotide, a nucleic acid, a vitamin, a monosaccharide, an oligosaccharide, a carbohydrate, a fatty acid, a lipid, an ion, an organic or inorganic compound, a drug, a pro-drug, a drug metabolite, a subcellular analyte, an organelle, a cell, a multicellular organism, a microorganism, a virus, a prion, a bacterium, a fungus, and a multicomponent complex containing any of the above.

32. The method of claim 31, wherein the reaction is used for detecting and/or measuring the level of the analyte in a sample.

33. The method of claim 32, wherein the sample is a biological sample.

34. The method of claim 1, wherein the mean CCV is the average of CCVs of all the pixels of an image captured by the camera in the same color mode, wherein the color mode is selected from the group consisting of RGB, HSB, CMYK, Grayscale, Lab, and any combination thereof.

35. The method of claim 1, wherein the real-time mean CCV is the average of real-time CCVs of all the pixels of an image captured by the camera in the same color mode, wherein the color mode is selected from the group consisting of RGB, HSB, CMYK, Grayscale, Lab, and any combination thereof.

* * * * *